United States Patent [19]

MacInnis et al.

[11] Patent Number: 4,584,635
[45] Date of Patent: Apr. 22, 1986

[54] FLUX CENTERING AND POWER CONTROL FOR HIGH FREQUENCY SWITCHING POWER

[75] Inventors: Alexander G. MacInnis; William B. Nunnery, both of Cary, N.C.

[73] Assignee: International Business Machines Corp., Armonk, N.Y.

[21] Appl. No.: 584,195

[22] Filed: Feb. 27, 1984

[51] Int. Cl.[4] .......................................... H02M 3/315
[52] U.S. Cl. ........................................ 363/25; 363/56
[58] Field of Search ...................... 363/26, 28, 56, 57, 363/97, 127, DIG. 1, 15

[56] References Cited

U.S. PATENT DOCUMENTS

| | | | |
|---|---|---|---|
| 4,146,832 | 3/1979 | McConnel | 363/19 |
| 4,150,424 | 4/1979 | Nuechterlein | 363/134 |
| 4,315,303 | 2/1982 | Snyder | 363/56 |
| 4,322,817 | 3/1982 | Kuster | 363/26 |

OTHER PUBLICATIONS

Redl, R., "Push-Pull Current-Fed Multiple-Output Wide-Input-Range DC/DC Power Converter", IEEE PESC Proc., 1981, pp. 204–212.
Patel, R., "Detecting Impending Core Saturation in Switched-Mode Power Converters", Unitrode Report, 1980.
Hirschberg, W. J., "New PWM Control Technique that Eliminates Transformer Unbalance", ACDC Electronics Div. Report, Powercon 6 Proc., 1979.
Wilson, R., "New Pulsewidth Modulation Method Inherently Maintains Output Transformer Flux Balance", Powercon 8 Proc., 1981, D-1, pp. 1–15.
Anderson et al., "Analysis of Static Characteristics and Dynamic Response of Push-Pull Switching Converters", IEEE PESC Proceeding, 1981, pp. 29–38.

Primary Examiner—Patrick R. Salce
Assistant Examiner—D. L. Rebsch
Attorney, Agent, or Firm—Joscelyn G. Cockburn

[57] ABSTRACT

A method and apparatus for controlling a power supply which includes a power transformer having primary and secondary windings and switching transistors for switching current through the windings. The apparatus includes circuitry for generating a composite signal representative of the flux and magnetizing current ($I_m$) in the power transformer. The composite signal is correlated with a multiphase clocking signal to generate a pulsewidth modulated (PWM) signal which is used to drive the switching transistors.

16 Claims, 3 Drawing Figures

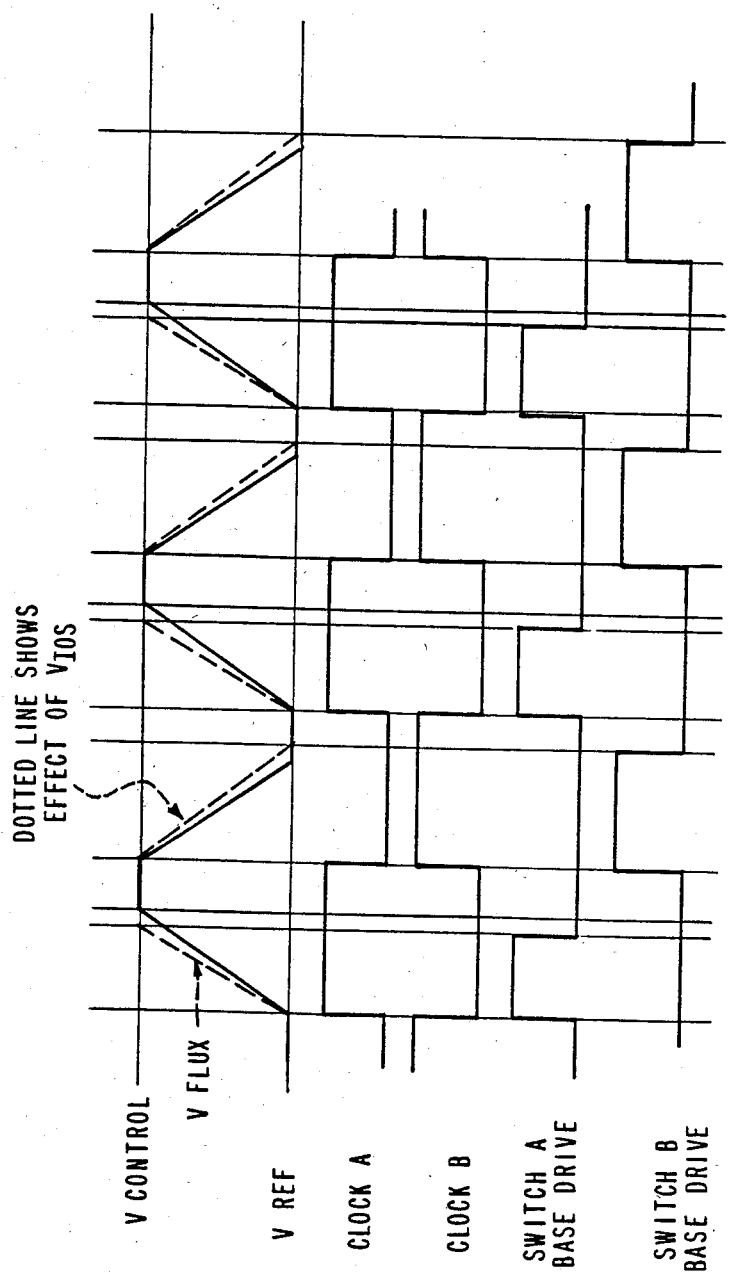

FLUX CENTERING AND POWER CONTROL FOR HIGH FREQUENCY SWITCHING POWER

BACKGROUND OF THE INVENTION (1) Field of the Invention

The invention relates to power supplies in general and more particularly to switch mode power supplies in which a power transformer is directly coupled to the bulk voltage.

(2) Prior Art

The use of switch mode power supplies for providing power to different types of loads is well known in the prior art. Generally, the prior art switch mode power supplies consist of a power transformer with an input coil or winding and an output winding. The input winding is connected to a supply voltage which provides electrical energy to the transformer. A switching circuit, which may be a bridge or a two-switch push pull design, is connected to the input winding. The circuit switches the direction of magnetic flux within the input winding as a result of voltage developed across the input winding. The voltage is induced onto the output winding. The voltage is then rectified and supplied to the attached load. A feedback error voltage is developed and is used to generate pulse width modulated signals which drive the switching circuits.

Such prior art power supplies, especially the double-ended, direct-coupled type, are notorious for becoming unstable and ultimately failing. The defect is even more pronounced when they are used with highly active loads. It is believed that the problem arises when the transformer is saturated. The saturation occurs when the magnetic flux density B, and/or the coercive force H exceeds safe bounds for the magnetic material used to manufacture the transformer, and the magnetizing inductance $I_m$ is reduced from its nominal value.

The prior art uses several methods for solving the saturation problem. Some of these methods will now be described.

One of the prior art techniques involves sensing the current in each of the two switches directly and using the signal to control the switch turnoff signals. This technique is referred to as a current balancing or current mode technique. The current has a ramp or saw tooth waveform and it is compared to a reference voltage. The intention is to keep the switch currents equal and indirectly keep the DC component of the magnetizing current ($I_m$) at 0. This technique presents several problems. Essentially, bipolar switches usually have unpredictable turnoff times which may be a substantial portion of on-time, so the true peak switch current, and the current expected and measured by the control system are quite different from one another. The result is that a DC component is added to $I_m$, tending to cause saturation.

The necessary response to the saturation problem is to use a gapped-core transformer that can tolerate considerable turn-current (NI) product offset, thereby necessitating larger, more expensive magnetic and switch components and decreased efficiency. Secondly, variations in load current, even though it may be filtered, will be reflected to the primary. The reflected current is indistinguishable from changes in magnetizing current. As the system attempts to equalize switch currents while there are changes due to load conditions, the balancing technique will cause some offset in $I_m$, and in turn result in a saturation problem. Variations in control voltage ($V_c$), typically due to feedback and generally of a large magnitude, cause variations in switch current even if this necessitates a further NI offset. All these problems result in the designer's selecting an oversized gapped-core transformer, oversize switches, and careful filter design. An example of this technique is described in an article entitled, "Analysis of the Static Characteristics and Dynamic Response of Push-Pull Switching Converters Operating in the Current Programmed Mode," by Andersen, B. E. et al and published in Proceedings, Power Electronics Specialist Conference, 1981, pp. 29-38, IEEE.

In another technique an inductor is placed in series with the DC input terminal of the transformer primary (center tapped only). This tends to hold the primary current constant, which tends to maintain transformer stability. Non-dissipative coupling of the inductor's stored energy is a problem. Also, leakage in coupled inductors causes spikes which appear on the switches. Leakage also causes a problem with regulation and efficiency, especially in systems with power over about 200 watts. Snubbers interfere with efficiency, ripple and regulation. A practical coupled inductor has to meet isolation specifications which cause increased leakage inductance, and the inductor is expensive. Reflected load currents can cause an $I_m$ offset. Even in lieu of load-related problems, there will be some offset current due to component tolerances, and the transformer will operate at one end of the B-H loop. The effect of the inductor, in limiting saturation current, is to increase output voltage ripple at the switching frequency, which is attenuated approximately 12 db less than normal ripple components. A more detailed discussion of this technique is given in an article entitled, "Push-Pull Current-Fed Multiple-Output Regulated Wide-Input-Range DC/DC Power Converter with Only One Inductor and with 0 to 100% Switch Duty Ratio: Operation at Duty Ratio Below 50%," by Redl, R. and Sokal, N. 0., and published in Power Electronics Specialist Conference, 1981, pp. 204-212, IEEE.

Another method is the flux-analog controlled method. This method is described by Wilson, Dick in an article entitled, "A New Pulsewidth Modulation Method Inherently Maintains Output Transformer Flux Balance," Proceedings of Powercon 8, pp. D-1, 1-D1, 15, Power Concepts, Inc. In this approach an analog of the flux is used to control switch timing, with the premise that if the flux change in each direction is exactly balanced the transformer will not saturate. The flux analog is derived by integrating the voltage on an auxiliary winding of the power transformer. One problem with this technique is that a practical integrator is imperfect at DC and low frequencies, and there is an additive constant error by virtue of the indefinite integral. To compensate, a circuit is added to detect the difference in peak switch currents, and this result is applied to the integrator in such a way as to modify switch times to equalize the peak currents. This technique is effective except for the aforementioned problem of reflected synchronous or transient load current at the primary. As previously stated, the reflection saturates the transformer. It is therefore necessary to ensure that the magnetizing current is much greater than the maximum reflected AC load current at the switch frequency, necessitating a gapped-core transformer or special output filter.

In yet another prior art method the switches driving the primary are essentially controlled in a standard pulsewidth modulated (PWM) fashion. The method senses saturation at the core directly, via an evenly-gapped E-E core and a special winding. The information, representative of core saturation, is used to modify switching times to correct the saturation problem. The gapped transformer implies problems with size, weight, cost and efficiency. In particular, the specially made transformers are expensive and of limited application. The introduction of an air gap implies large magnetizing current. A more detailed description of this technique is given by Patel, Raoji, in an article entitled, "Detecting Impending Core Saturation in Switched-Mode Power Converters," Unitrode Power Supply Design Seminar, 1980, Unitrode Corporation, Lexington, Mass.

As is obvious from the above description, all previous solutions utilize either a special, complicated transformer to find the effects of saturation, or they base the protection method on measurement of the primary current, $I_p$. Since in the desired mode of operation the magnetizing current $I_m$ is much smaller than $I_p$, the prior art technique does not give an estimate or measure $I_m$. It merely defines $I_m$ as having already become excessively high.

SUMMARY OF THE INVENTION

It is a general object of the present invention to provide an improved and more efficient power supply than has heretofore been possible.

It is another object of the present invention to provide a novel and efficient controller which switches the current in the power transistors so that the transformer is maintained below the saturation level.

The improved power supply includes a power transformer having a core with secondary and primary windings. The primary windings include a bulk power supply and a plurality of switching transistors. The secondary winding is coupled by an appropriate circuit to an output terminal which supplies power to a load. A sense winding and serially connected integrating circuitry are used to generate a signal representative of the total magnetic flux within the power transformer. A sensing device and appropriate circuitry are used to generate an offsetting signal representative of the magnetizing current ($I_m$) within the power transformer. The magnetizing current is equivalent to the magnetizing flux. A composite signal is formed from the offsetting signal and the total magnetic flux signal. A multiphase clocking signal is gated with the composite signal to generate a pulse-width modulated signal which is used to switch the power transistor so that the $I_m$ and hence the offsetting magnetic flux are maintained at an acceptable level. By combining the offsetting signal with the total magnetic flux signal, the DC component of the flux is eliminated and the composite signal represents an accurate value of the flux within the core of the power transformer.

In one feature of the invention, the sensing device includes a coil and a resistor coupled to the secondary windings. Current is allowed to flow in the resistor only when the power switches are in an off state. This ensures that the value of the composite signal is a true measure of $I_m$.

The foregoing features and advantages of the invention will be more fully described in the accompanying drawings.

DESCRIPTION OF THE DRAWINGS

FIG. 3 shows a graphical representation of the signals which are combined to form a pulse-width modulated (PWM) signal. The (PWM) signal is used to switch the power transistors which control current flow through the power transformer.

DESCRIPTION OF THE PREFERRED EMBODIMENT

Figure 1:
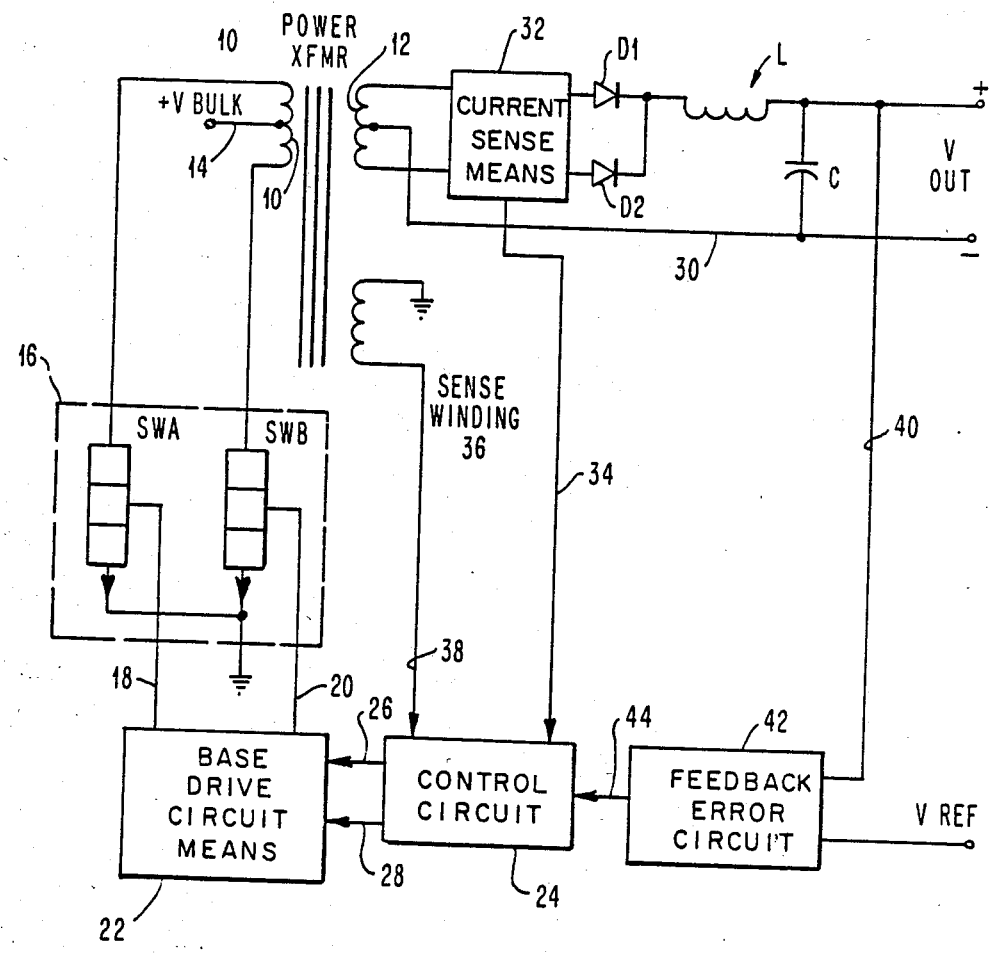
FIG. 1 shows a block diagram of an improved power supply according to the teachings of the present invention.

FIG. 1 shows a block diagram of the improved power supply according to the teachings of the present invention. The power supply comprises of a power transformer with a primary coil identified by numeral 10 and a secondary coil identified by numeral 12. A center-tap point on the primary coil is connected by conductor 14 to a voltage supply source identified as $V_{bulk}$.

A switching means identified by numeral 16 is connected to the primary coil. The function of the switching means is to switch current so that it flows bi-directionally within the primary winding, and as a result a voltage is generated across the winding. Although a plurality of switching devices, such as bridges etc., can be used to control the current flow within the primary winding, in the preferred embodiment of this invention the switching means comprises of a pair of power transistors identified as switch A (SWA) and switch B (SWB). The power transistors are connected in a push-pull fashion with their emitters connected to a common ground level and their respective bases are connected over conductors 18 and 20, respectively, to a base drive circuit means identified by numeral 22. Base drive circuit means 22 is primarily an amplification type circuit which accepts the control signals which are supplied from control circuit means 24 via conductors 26 and 28, respectively, amplify these signals and feed them over conductors 18 and 20 so that the switching of the power transistors is out of phase. Since the base drive circuit means are conventional circuitry, details will not be given. Suffice it to say that it is within the skill of one skilled in the art to develop an appropriate circuitry for amplifying the signals supplied over conductors 26 and 28, respectively.

Still referring to FIG. 1, the output section of the power supply includes the secondary winding 12. A conductor identified by numeral 30 interconnects a center-tap point on the primary winding with a negative potential output terminal. Current sense means 32 is connected to the output of the secondary winding. As will be explained hereinafter, the function of current sense means 32 is to generate a signal which represents the magnetizing current ($I_m$) in the transformer and feed that current over conductor 34 into control circuit means 24.

Likewise, a signal representative of the flux in the power transformer is generated by sense winding 36. The signal is fed over conductor 38 into control circuit means 24. The details of current sensing means 32 and control circuit means 24 which form the crux of this invention will be given hereinafter. Suffice it to say, at this point, that the sense winding 36 in conjunction with current sense means 32 and control circuit means 24 generates a first electrical signal which represents the total flux in the transformer. A second electrical signal representative of the magnetizing current is also generated. An integrator (to be described later) integrates both signals and generates therefrom a composite signal. The composite signal is gated with a two-phase clock which is 180° out of phase and generates a pulse width modulated signal which is fed over conductors 26 and 28, respectively, into the base drive circuit means 22. The base drive circuit means 22 amplifies the signal and feeds it to the base of switch A and switch B over conductors 18 and 20, respectively.

Still referring to FIG. 1, the output from current sense means 32 is fed into diodes D1 and D2, respectively. The function of D1 and D2 is to modulate or rectify the signal outputted from current sense means 32. The rectified signal is then fed through the LC circuit and into the attached load (not shown). Conductor 40 interconnects the positive output terminal to feedback error circuit means 42. The function of feedback error circuit means 42 is to correlate the feedback signal on conductor 40 with a reference signal and generates an error signal on conductor 44. The error signal on conductor 44 is fed into control circuit means 24 from whence it is used in formulating the pulsewidth modulated pulses which are used to control switch A and switch B, respectively.

Figure 2:
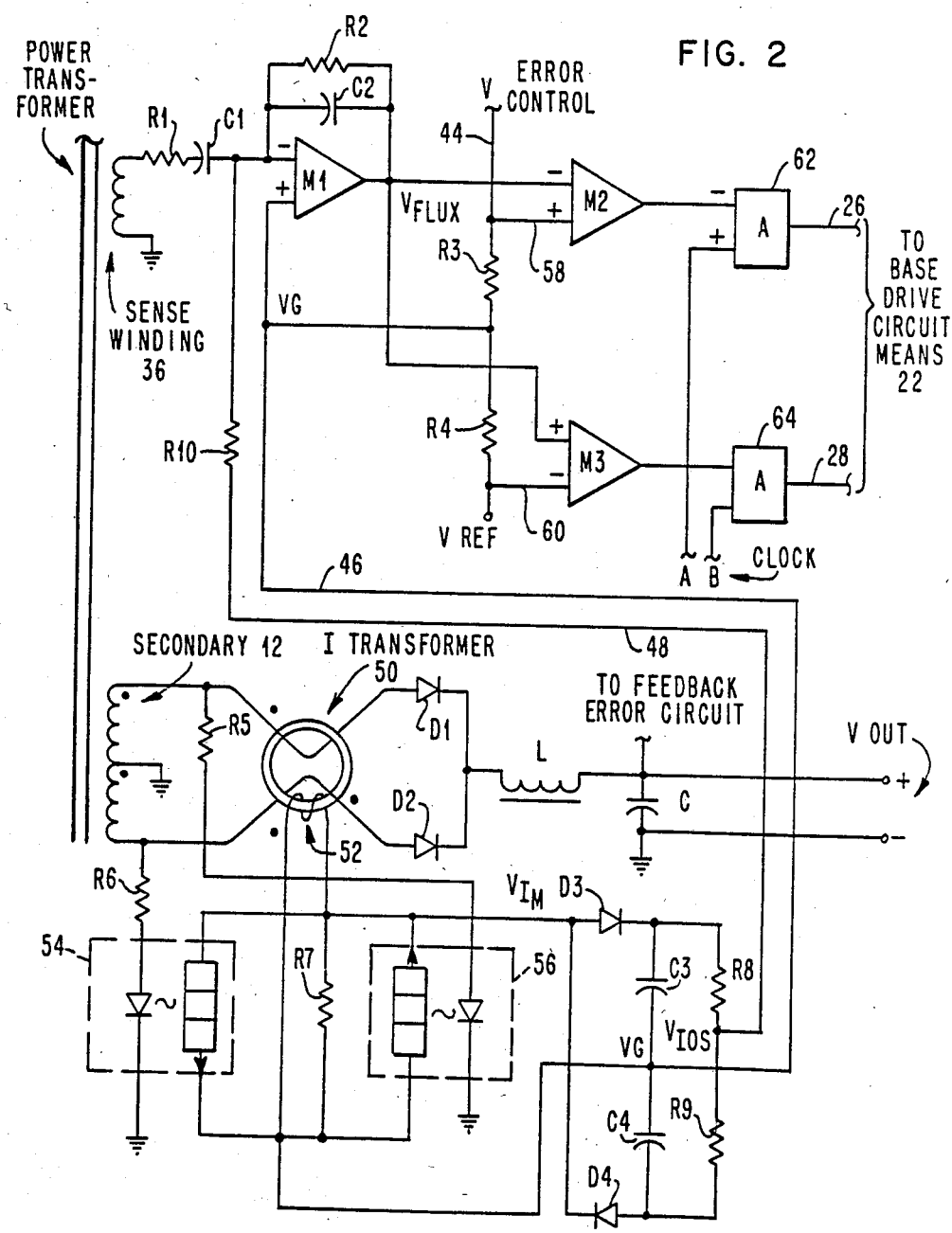
FIG. 2 shows a detailed schematic of the novel circuitry which controls the power supply of FIG. 1.

FIG. 2 shows a detailed circuitry for the control means which generates the pulsewidth modulated signals for controlling switch A and switch B (FIG. 1). In order to simplify the description items in FIG. 2 that are identical to items in FIG. 1 are identified by common symbols. To this end, sense winding 36 which senses the flux in the transformer is connected to an integrator formed by resistors R1, C2 and M1. M1 is a conventional operational amplifier. C1 is connected to R1 and the negative input of M1. C1 serves as an AC coupler and couples the output of the sense winding into the integrator. R2 is connected across M1 and serves as a DC stabilizer to M1. Furthermore, R2 moves the integrator pole away from the origin.

Two of the signals $V_g$ and $V_{ios}$ are generated and fed over conductors 46 and 48, respectively. $V_{ios}$ is the error voltage ($V_{error}$) due to an offset in the magnetizing current ($I_{mag}$); The signal on conductor 48 is fed into the negative terminal of M1 while the signal on conductor 46 is fed into the positive terminal of M1. In order to generate the signals a current transformer ($I_{xfmr}$) 50, having a core and a winding identified by numeral 52, is connected to the secondary winding 12 of the transformer. The purpose of the current transformer is to generate a current ($I_m$) which is the equivalent of the magnetizing current in the transformer core. This current which will increase and ultimately damage the transformer, if it is not properly controlled, is converted into a measurement voltage called $V_{Im}$. $V_{Im}$ represents the magnetizing voltage and is reconverted into the current via $R_{10}$ and fed into the negative terminal of the integrator. The magnetizing current $I_m$ is only measured when the power switches SWA and SWB are in the off state. When either of the switches is conducting the output from the secondary winding is fed through D1, D2, L and C to $V_{out}$. The elements D1, D2, L and C have already been described in the discussion of FIG. 1. They perform the same functions in FIG. 2 and as such further discussion relative to these elements will not be given.

Still referring to FIG. 2, the coil 52 is connected to resistor R7. The function of R7 is to generate the measurement voltage $V_{Im}$ when the power transistor switches SWA and SWB (FIG. 1) are in the off state. A current switching circuit means or current circuit control means identified by numeral 54 is connected through R6 to one terminal of the secondary winding. Another current circuit control means 56 is coupled through a resistor R5 to the other terminal of the secondary winding. The function of current circuit control means 54 and 56 is to monitor the voltage on the secondary winding and when there is a voltage the switching means acts as a short and as a result no current flows through R7 and therefore there is no output $V_{Im}$. However, when the power transistors SWA and SWB (FIG. 1) is off, current flows through R7 and a voltage is presented at point $V_{Im}$. By using two current circuit control means both the positive and negative swing of the voltage across the secondary winding is monitored.

In the preferred embodiment of this invention the circuit control means 54 and 56 are conventional opto-isolators. These isolators are off the shelf packages and include a diode and a transistor. When the diode conducts, the transistor is turned on and acts as a short and diverts current away from the resistor R7. It should be noted that other devices other than opto-isolators can be used to control the current across R7. In this embodiment opto-isolators were used because of their isolation properties and the fact that the isolators stay on until the secondary voltage on the power transformer collapses. This property provides a simple way of treating unpredictable storage times ($T_{stg}$) in the power switches. However, in a supply using components such as power MOSFETs one could probably use bipolar transistors instead of opto-isolators if $T_{stg}$ is not a problem.

D3, D4, C3, C4 form peak detectors; this function could be performed by other circuitry, such as integrated peak detectors.

Still referring to FIG. 2, resistor R7 is connected to diodes D3 and D4, respectively. Diodes D3 and D4 are poled (that is, connected to conduct) in opposite directions. Capacitor C3 connects the cathode of diode D3 to reference $V_g$ while capacitor C4 connects reference $V_g$ to the anode of diode D4. As stated before, $V_{Im}$ is the voltage representation of the magnetizing current signal, and $V_g$ is a reference voltage referred to hereinafter as the artificial ground potential. A pair of resistors R8 and R9 is connected in series and form a voltage divider. The series connected resistors are connected to the cathode and anode of diodes D3 and D4, respectively and generate a second reference voltage identified as $V_{IOS}$.

Voltage divider R3 and R4 combine a signal identified as $V_{ref}$, a signal identified as V error control on conductor 44 and $V_g$ and output two signals on conductors 58 and 60, respectively. The signal on conductor 58 is fed into the positive terminal of comparator means M2 while the signal on conductor 60 is fed into the negative terminal of comparator M3. The positive terminal of comparator M3 is connected to the output of M1 and the negative terminal of M2 is connected to the output of M1. The outputs of M2 and M3 are gated with clock pulses A and B by means of logical "AND" circuit means 62 and 64, respectively. The signals from the AND circuit means are fed over conductors 26 and 28 to drive the power transistors.

FIG. 3 shows a series of curves representing the signals which are developed by the circuit of FIG. 2. These signals are used for driving the power transistors of FIG. 1 so that the power transformer operates at a level below its saturation point. The curves are exaggerated to make clear the improvement which the present invention adds to the prior art power supply of the direct coupled topography. The first curve in the figure identified as $V_{flux}$ is a composite signal which represents the estimated flux in the transformer and the effect of $V_{ios}$ (voltage representing the magnetizing current offset). The dotted line shows the effect of $V_{ios}$ on the estimate of the flux. The solid line in FIG. 3 represents the estimate of the flux without applicants' invention.

The horizontal line identified as $V_{ref}$ in curve 1 represents $V_{ref}$ in FIG. 2 while the horizontal line identified as $V_{control}$ represents the error feedback control signal. The overshoot of the signal above $V_{control}$ is due to the storage time in the switches.

The second and third curves identified as clock A and clock B are two out of phase clock pulses which are used to gate the composite flux signal. Similarly, the fourth and fifth curves identified as switch A-based drive and switch B-based drive represent the modulated pulses which are used to switch the power transistors in FIG. 1. It should be noted that the width of these pulses differs by the difference between the solid and dotted curves of V flux.

OPERATION

In the above embodiment the sense winding 36 is a separate secondary of the power transformer. $M_1$ is an op-amp, and in conjunction with C5 and R4, forms an integrator.

$C_1$ is used for AC coupling, the output from the sense winding into the integrator. Also, R2 is necessary for DC stabilization, moving the integrator's pole away from the origin. M2 and M3 are comparators and $V_g$ is an artificial ground. R3=R4, therefore, $V_{control} = -V_{ref}$ with respect to Vg.

$$\text{Since } V_{flux} = K_1 \int_{t_0}^{t_1} E_T dt + K_2$$

where $K_1$ and $K_2$ are constants, $V_{flux}$ is proportional to the flux in the transformer if $K_2=0$ and $V_{sense}$ (that is, the voltage sensed across the sense winding) is proportional to $E_{core}$.

Clock signals A and B are 180° out of phase and operate at a fixed frequency, so either switch A or switch B is enabled. The switch stays on until $V_{flux}$ crosses $V_{control}$ or $V_{ref}$ (FIG. 3), respectively, at which time the proper comparator M2 or M3 changes state and turns off the switch.

In this way, during each power pulse the magnitude of the flux excursion, or change from the previous value, gives the same for both positive and negative excursions, corresponding to alternating closings of switches A and B. Even if the input voltage to the transformer varies drastically, the flux applied to the transformer is still forced to the controlled value. Similarly, if switches A and B have very different storage times ($T_{stg}$), there will be only a small and constant flux offset. In fact, the flux offset will be nearly zero due to the effect of the $I_m$ offset control.

In order for the integrator (FIG. 2) to have an accurate measurement of the flux in the transformer it is necessary to know the long term flux. It should be noted that the flux and the magnetizing current ($I_m$) are related directly by the B-H curves of the transformer. Furthermore, if the average value of $I_m$ is 0, then the average value of the flux is 0 for all transformers. The signal $V_{ios}$, (FIG. 2) or the voltage corresponding to the magnetizing current offset, is inputted to the integrator M1 in such a way as to cause the integrator's output to constantly increase or decrease with a flow proportional to the input $V_{ios}$. In this way, all transitions in one direction (positive or negative) of the integrator's output will be shortened, while those in the other direction will be lengthened (FIG. 3—first curve). This causes unequal amounts of flux to be applied to the transformer in opposite directions. With this change being in the proper direction, the flux and $I_m$ offset are reduced to 0. This offsetting action is proportional to the amplitude of $V_{ios}$, and continues until $V_{ios}$ becomes 0 with respect to $V_g$.

It should be noted that the loop has a maximum phase shift of 90°, from the integrator, so it is unconditionally stable. The only cause of $I_m$ offset which necessitates this loop is terms which are essentially constant. The terms include imbalanced power switch storage time, imbalancing switch voltage drop, imbalancing transformer primary winding coupling, and offset voltage and bias current in the integrator's OP-AMP. As a result, this loop need not contend with such causes as dynamic load current, and the median value of $I_m$ will be maintained at or very near 0 regardless of operating conditions, for similar reasons the gain of the ($I_m$—offset loop) is not critical.

It should also be noted that the magnetizing current ($I_m$) is measured when the power switches are in an off state. As a result, a true measure of the magnetizing current $I_m$ is obtained.

A power supply using the above described control method has excellent open loop regulating properties. The volt second integral of the transformer core is directly held constant over each pulse save for errors due to timing delays. This causes a constant average input voltage to the averaging output filter. Regulation deviations are due to effective series resistance on series output devices (secondary windings, rectifiers, inductors). Primary losses do not affect regulation, unlike feed forward circuits added to conventional pulsewidth modulator controls. The need for feedback is greatly reduced or eliminated, allowing improved regulation and stability with less gain and/or the omission of direct output sensing. This simplifies system design and component choices and reduces the count of expensive isolated power and feedback components.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. An improved power supply comprising:
   a power transformer having a magnetic core with a primary winding and a secondary winding thereon;
   switching means coupled to the primary windings and operable for switching current bi-directionally therethrough;
   a first means operable for generating a first signal representative of the total magnetic flux within said transformer;
   a second means operable for generating a second signal representative of the magnetizing offsetting current within the transformer;

means for combining the first signal and the second signal and to generate a composite signal;

means being responsive to the composite signal and operable to generate a series of control pulses for activating the switching means so that the transformer is caused to operate below its saturation level.

2. The improved power supply of claim 1 fruther including a voltage source for supplying power to the primary windings of the power transformer.

3. The improved power supply of claim 1 wherein the switching means includes a pair of power transistors being connected in a push-pull configuration to the primary winding.

4. The improved power supply of claim 1 wherein the first means includes a sense winding mounted on the core of the power transformer.

5. An improved power supply comprising:

a power transformer having a magnetic core with a primary winding and a secondary winding thereon;

switching means coupled to the primary windings and operable for switching current bi-directionally therethrough;

a first means operable for generating a first signal representative of the total magnetic flux within said transformer;

means including a sensing device coupled to the secondary winding and operable to sense current thereon;

a voltage generating means connected to the sensing device;

means for monitoring the voltage on the secondary winding and for switching the current flowing through the sensing device so that current periodically flows through the voltage generating means to form a first reference voltage proportional to $I_m$ thereacross;

means operable for detecting and storing the first reference voltage;

means operable to monitor the first reference voltage and to generate a second reference voltage relative to the first reference voltage;

means operable for monitoring the second reference voltage and to generate a second signal therefrom;

means for combining the first signal and the second signal and to generate a composite signal therefrom; and means being responsive to the composite signal and operable to generate a series of control pulses for activating the switching means so that the transformer is caused to operate below its saturation level.

6. The improved power supply of claim 5 wherein the sensing device includes a transformer with a winding thereon.

7. The improved power supply of claim 5 wherein the means for monitoring the voltage includes a resistor.

8. The improved power supply of claim 5 wherein the means for monitoring the voltage on the secondary winding includes a pair of opto-isolators with one of said opto-isolators being operable to sense the voltage in a positive direction and the other being operable for sensing the voltage in a negative direction.

9. The improved power supply of claim 5 wherein the means for detecting and storing the first reference voltage includes a first diode poled to conduct in a first direction;

a first capacitive storage device having one plate being connected to the first diode and a second plate being connected to an artificial ground reference level;

a second capacitive storage device having one plate connected to the artificial ground node; and a second diode being connected to the second capacitive storage means and poled to conduct in a direction opposite to that of the first diode.

10. The improved power supply of claim 5 wherein the means for monitoring the first reference voltage includes a pair of series connected resistors.

11. The improved power supply of claim 1 wherein the means for combining the first and second signals includes an integrating circuit; and a pair of comparator circuits with each circuit having two inputs and a single output.

12. The improved power supply of claim 1 wherein the means being responsive to the composite signal includes a pair of logical "AND" circuits with each one having at least one input to accept a clock pulse.

13. In a power supply having a power transformer with an input winding and an output winding and a switching means for driving the input winding, an improved means for generating pulsewidth modulated control signals for enabling the switching means comprising:

a first means coupled to the power transformer; said first means being operable for generating a first signal representative of the total magnetic flux within said transformer;

a second means coupled to the output winding and operable for generating a second signal representative of an offsetting magnetic flux;

means for combining the first and second signals and to generate a composite signal; and means being responsive to the composite signal and operable for generating the pulsewidth modulated control signals.

14. In a power supply having a power transformer with an input winding and an output winding and a switching means for driving the input winding, an improved method for generating pulsewidth modulated control signals for enabling the switching means comprising the steps of:

(a) generating a first signal representing the total magnetic flux in the transformer;

(b) generating a second signal representing an offsetting magnetic flux;

(c) combining the first and second signal to generate a composite signal; and (d) combining the composite signal with a multiphase clock pulse to generate the pulsewidth modulated control signals.

15. The method of claim 14 wherein the second signal of step (b) is being generated from the output winding during a time interval when the switching means is in a non-conductive state.

16. An apparatus for generating a signal representing the magnetizing current ($I_m$) in the power transformer of a power supply said apparatus comprising:

a sensing means coupled to the secondary winding of the power transformer and operable for sensing a current therein;

first means coupled to the sensing means and operable for generating a periodic voltage; and second means for monitoring a voltage on the secondary winding and for periodically switching current flow from the first means through said second means whereby the current flowing through said first means is representative of the magnetizing current ($I_m$).

* * * * *

UNITED STATES PATENT AND TRADEMARK OFFICE
CERTIFICATE OF CORRECTION

PATENT NO. : 4,584,635

DATED : April 22, 1986

INVENTOR(S) : Alexander G. MacInnis and William B. Nunnery

It is certified that error appears in the above-identified patent and that said Letters Patent is hereby corrected as shown below:

On the cover page, the title should read:

Title: FLUX CENTERING AND POWER CONTROL FOR HIGH FREQUENCY SWITCHING POWER SUPPLIES Signed and Sealed this Fifteenth Day of July 1986

[SEAL]

Attest:

Attesting Officer

DONALD J. QUIGG

Commissioner of Patents and Trademarks